No. 785,209. PATENTED MAR. 21, 1905.
G. HAMILTON.
AUTOMATIC BEAM SCALE.
APPLICATION FILED JAN. 11, 1904.
4 SHEETS—SHEET 1.
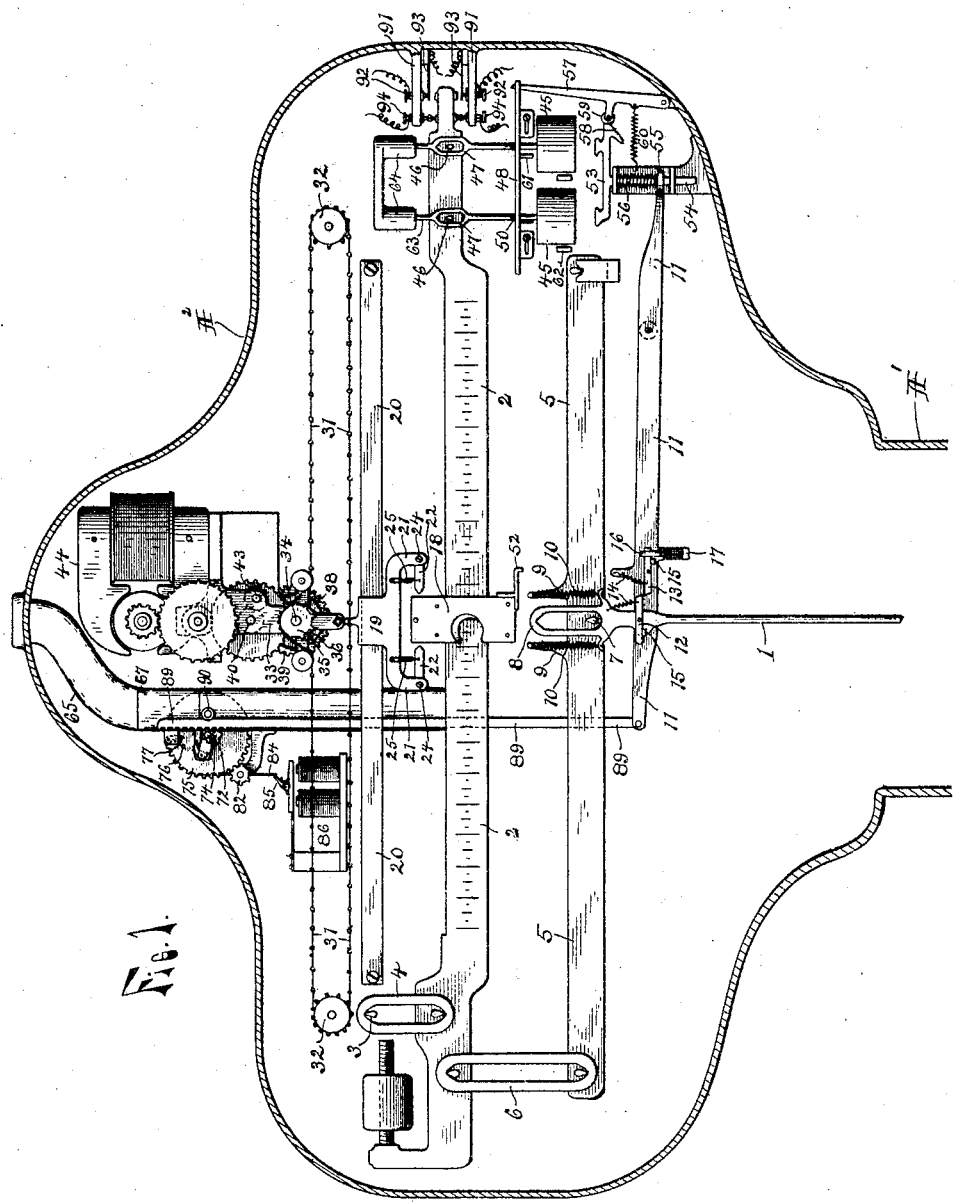
WITNESSES.
Lewis E. Flanders
Thomas G. Longstaff
INVENTOR.
Guy Hamilton,
By Barthel & Barthel
Attorneys.

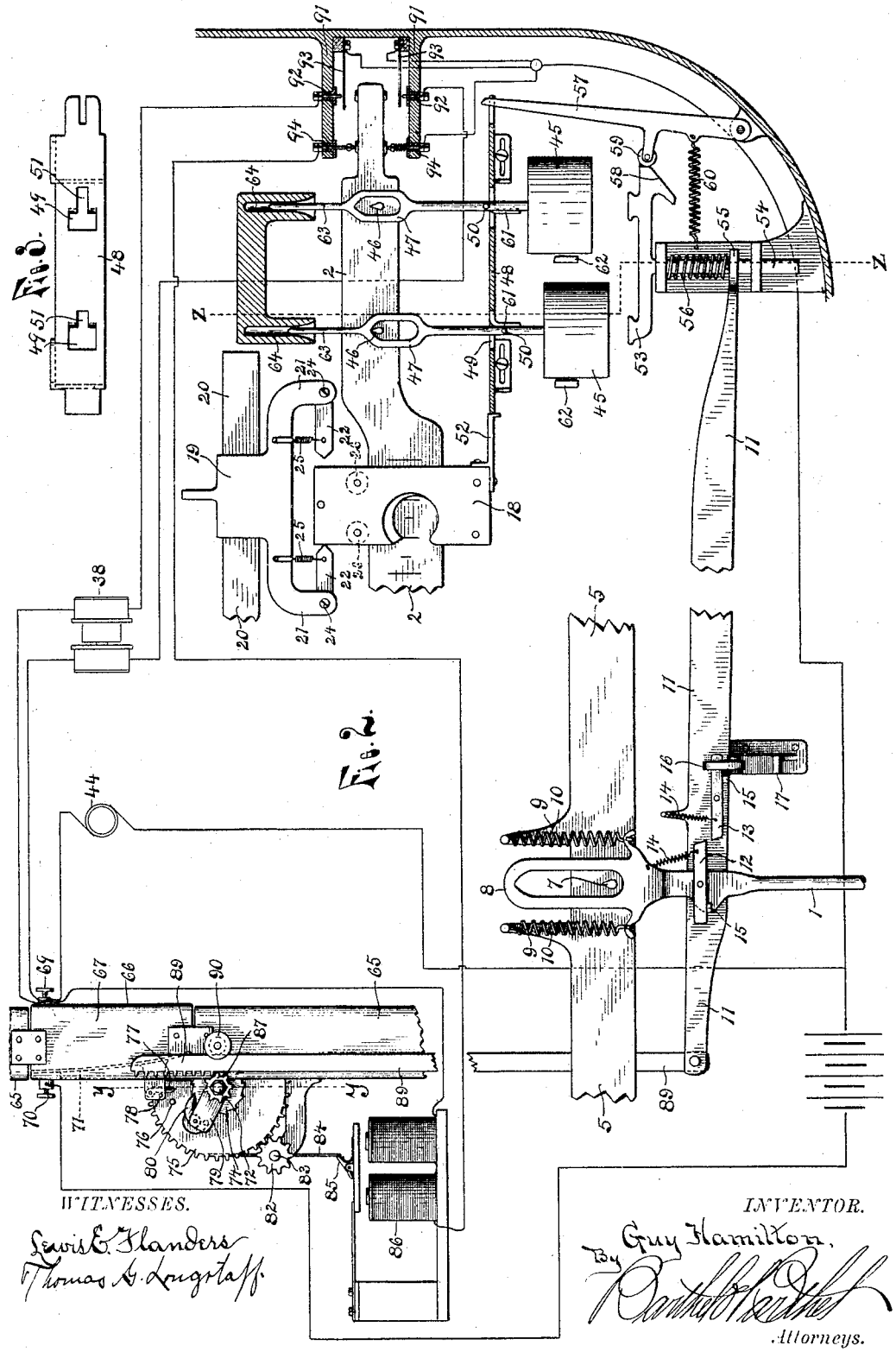

No. 785,209. PATENTED MAR. 21, 1905.
G. HAMILTON.
AUTOMATIC BEAM SCALE.
APPLICATION FILED JAN. 11, 1904.
4 SHEETS—SHEET 3.
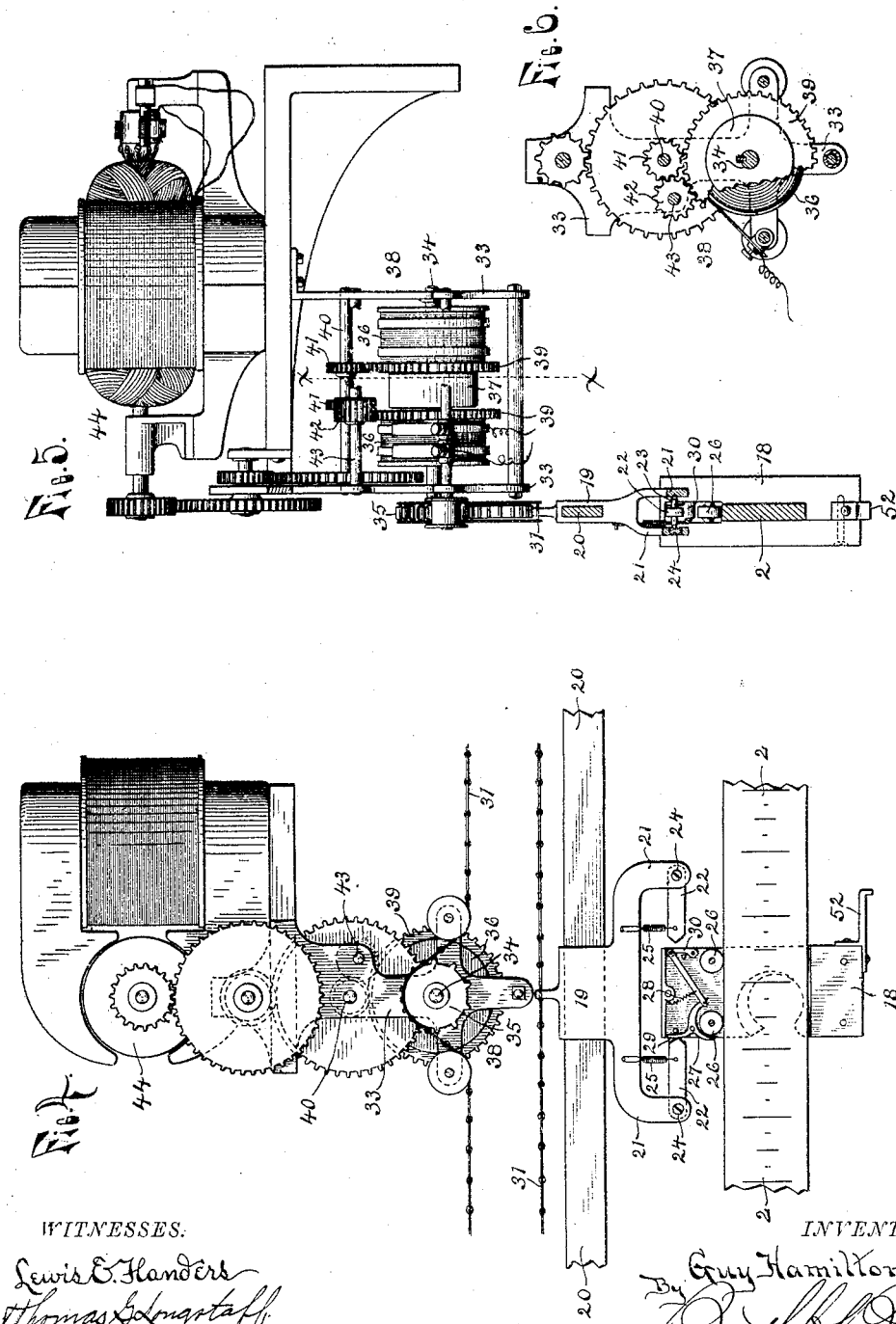
WITNESSES.
Lewis E. Flanders
Thomas G. Longstaff
INVENTOR.
Guy Hamilton,
By
Attorneys.

No. 785,209. PATENTED MAR. 21, 1905.
G. HAMILTON.
AUTOMATIC BEAM SCALE.
APPLICATION FILED JAN. 11, 1904.
4 SHEETS—SHEET 4.
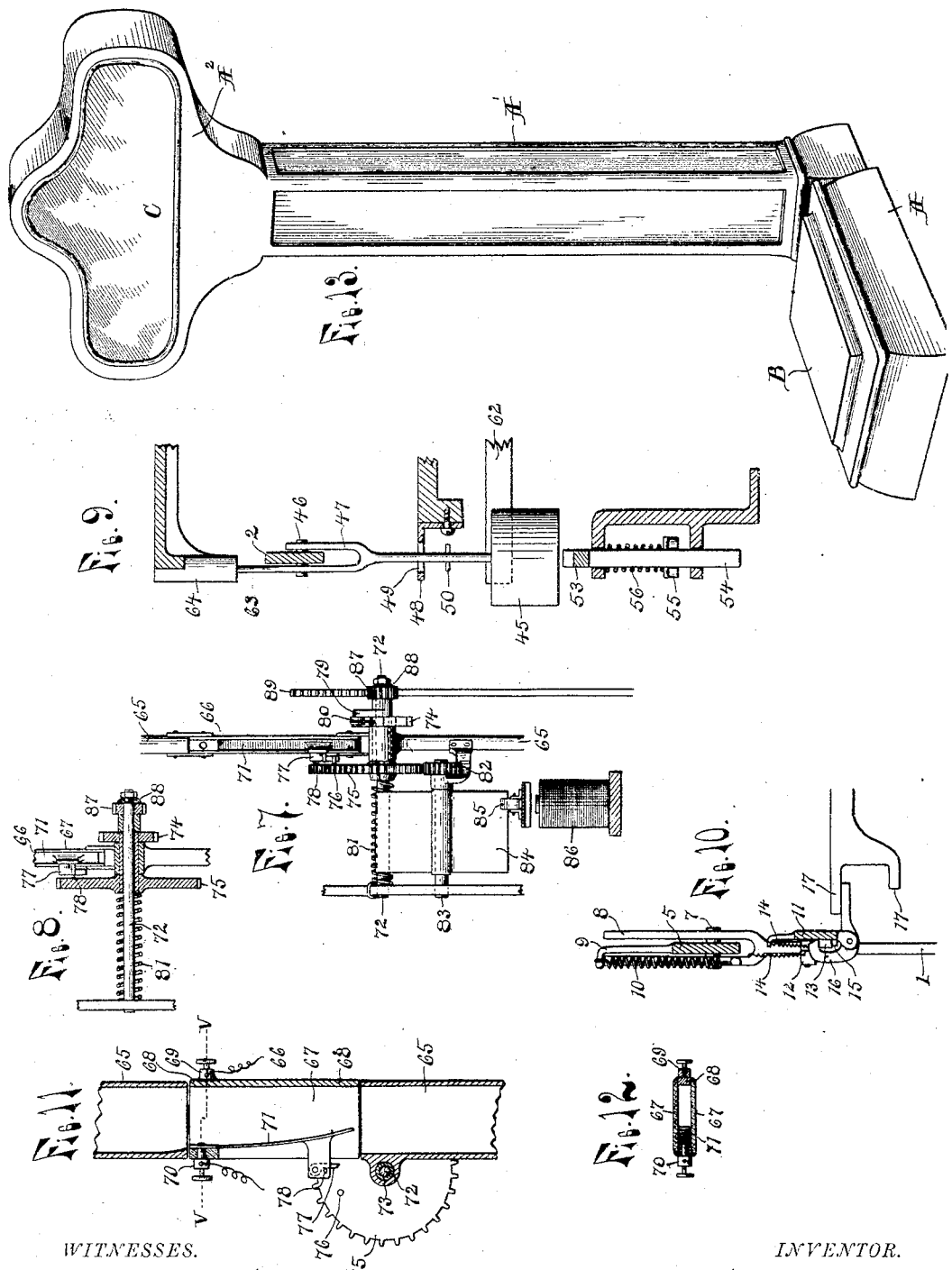
WITNESSES.
Lewis E. Flanders
Thomas G. Longstaff
INVENTOR.
Guy Hamilton
By Barthel & Barthel
Attorneys.

No. 785,209. Patented March 21, 1905.

UNITED STATES PATENT OFFICE.

GUY HAMILTON, OF DETROIT, MICHIGAN, ASSIGNOR TO THE CAILLE BROS. COMPANY, OF DETROIT, MICHIGAN, A CORPORATION OF MICHIGAN.

AUTOMATIC BEAM-SCALE.

SPECIFICATION forming part of Letters Patent No. 785,209, dated March 21, 1905.

Application filed January 11, 1904. Serial No. 188,483.

*To all whom it may concern:*

Be it known that I, GUY HAMILTON, a citizen of the United States of America, residing at Detroit, in the county of Wayne and State of Michigan, have invented certain new and useful Improvements in Automatic Beam-Scales, of which the following is a specification, reference being had therein to the accompanying drawings.

This invention relates to improvements in platform-scales of the class known as "beam-scales;" and its object is to provide a scale of this class with mechanism which will automatically operate when weight is put upon the platform, to move the poise-block along the beam to balance the scale and indicate the amount of weight, and also to provide other poise-weights and mechanism for automatically connecting said weights with the beam and disconnecting the same therefrom to increase the range of the scale.

It is also an object of the invention to provide mechanism whereby the operation of the scale is controlled by a coin, so than when a coin is dropped in the scale will be automatically adjusted to a balance and the weight indicated without any further act by the operator; and a further object is to provide certain other new and useful features, all as hereinafter more fully described, reference being had to the accompanying drawings, in which—

Figure 1 is a vertical section through the upper part or head of the casing of a device embodying the invention, showing the mechanism in side elevation. Fig. 2 consists of enlarged details arranged in their proper relation to each other, showing in front elevation the coin holding and releasing mechanism, the mechanism for holding and releasing the counterweights, the means for operating the coin-releasing mechanism and for raising the weights, and showing the electrical circuits with the motor and clutch indicated. Fig. 3 is a detail of the supporting-plate for the hanging poise, showing the same in plan view. Fig. 4 is an enlarged detail showing the motor, clutch, sliding poise, and means connecting the same in front elevation. Fig. 5 is a detail of the same in side elevation. Fig. 6 is a section on line $xx$ of Fig. 5 with parts broken away to show the construction. Fig. 7 is a detail showing the coin holding and releasing mechanism in side elevation. Fig. 8 is a section of the same on the line $yy$ of Fig. 2. Fig. 9 is a detail of the counterweight-operating mechanism, showing the same in section on the line $zz$ of Fig. 2. Fig. 10 is a detail showing an edge view of the means for providing a lost motion between the draft-rod and draft-bar and the levers connecting said rod and the operating-bar. Fig. 11 is a sectional detail of the coin-chute; Fig. 12, a section of said chute on the line $vv$ of Fig. 11, and Fig. 13 is a perspective view showing the exterior of a complete device embodying the invention.

As shown in Fig. 13, the casing is designed to adapt the device for use as a penny-in-the slot machine, it consisting of a base portion A, from the rear of which rises a standard A' of such height that the head portion A² of the casing on the upper end of said standard will be in a convenient position for the person standing upon the platform B to look into the casing-head through the glass front C, provided therein The platform B is supported in position on the base by any suitable lever system, (not shown,) to which system the draft-rod 1 is attached at its lower end to be operated thereby and extends upward in the column or standard A' to the head to actuate the scale-beam 2. Said beam is pivotally supported near one end by links 4, engaging the knife-edge bearing 3 on the casing and a similar bearing-pin on the beam, and supported on the casing at one end by a suitable knife-edge bearing at a distance below the scale-beam is a draft-bar 5, connected at its opposite end to the short arm of the beam by links 6, engaging knife-edge pins on the beam and bar.

The draft-rod 1 is so attached to the draft-bar 5 that there is a lost motion between the rod and bar—that is, when weight is applied to the platform B the rod will move downward a certain distance before the bar will be operated—and to secure this lost motion said bar is provided intermediate its ends with a knife-edge-bearing pin 7, extending through the bar and projecting laterally from its sides, and the upper end of the draft-rod is provided with slots or loops 8, through which the ends of said pin extend, said loops extending upward, one at each side of the bar. On the upper edge of the draft-bar are upwardly-extending arms 9, forming points of attachment for the springs 10, which are attached at their opposite ends to hooks on the draft-rod and operate to normally or when there is no weight on the platform hold the rod raised relative to the bar, with the pin 7 at the lower end of the loops 8, said springs being of just sufficient strength to hold the rod in this position against the weight of the platform, &c.

The lost motion of the draft-rod is utilized to actuate the operating-bar 11, which is pivoted intermediate its ends to the casing, by pivoting a lever 12 intermediate its ends to said rod to engage a lever 13, similarly pivoted to the operating-bar, which levers are normally held in a horizontal position to engage each other by springs 14, attached to said levers near one of their ends and operating to hold their opposite ends in contact with stops 15. The lever 12 is so arranged that when its end engages the lever 13 upon the downward movement of the draft-rod its stop will prevent its turning from its horizontal position, and to prevent the lever 13 from so turning, so that it will firmly engage lever 12, and thus turn the operating-bar to which it is attached, a hook 16 is pivoted to the lower edge of the bar and hooks over the end of the lever 13. An arm on the hook 16 extends beneath the operating-bar into the path of lugs 17 on the casing, so that as the bar is moved down the lower lug will engage said arm and disengage the hook from the lever 13 to release the same, which will turn on its pivot and allow the lever 12 to pass and the bar to turn back to its normal position, the lever 13 being at once returned to its horizontal position when the lever 12 has passed by its spring 14. The upper lug 17 engages the arm of the hook on the upward or return movement of the bar and turns said hook into engagement with the lever again, said lug also forming a stop to limit the upward movement of the operating-bar.

On the beam 2 is the sliding poise 18, and to move said poise a carriage 19, adapted to slide upon a track-bar 20, supported in a horizontal position above the beam and at a distance therefrom, is provided having two laterally and downwardly extending arms 21 at each end, between the lower ends of which arms are pivotally secured the contact or push bars 22, having pointed ends to engage the poise. In order that these push-bars may be very sensitive to any movement of the poise as the beam vibrates and move freely therewith, their pivots are formed by providing each with a transverse pivot-pin 23, having pointed ends engaging sockets in the arms at one side and similar sockets in the ends of screws 24 screwed into openings in the arms at the other side. These contact-bars are supported normally in a horizontal position by coiled springs 25, attached to the free ends of said bars and to the block, so that they will always be in position to engage the poise, yet free to rise or fall with the movement of said poise as the beam moves.

The sliding poise is made in two parts to embrace the beam, with a chamber at the upper edge of the beam, within which are two rolls 26, engaging the upper edge of the beam to support the poise so that it will move freely, and to frictionally hold the poise in any position to which it may be adjusted on the beam (see Fig. 4) a brake 27 is pivoted adjacent to one of the rolls to engage and prevent the same from turning. A spring 28 normally holds the brake against the roll, and an arm 29 on the brake extends upward in a position to be engaged by the contact-bar at that side of the poise, so that when the block 19 is moved to move the poise said contact will engage the arm and turn the brake out of contact with the roll to allow the poise to be moved freely by said contact-bar.

The contact-bar at the opposite side of the poise when brought into engagement therewith to move the same will engage a short lever 30, pivoted at one end to the poise and at its opposite end to a connecting-bar connecting it with the brake, so that said brake will be moved to release the roll.

The carriage 19 is moved to adjust the poise 18 by an endless sprocket-chain 31 passing over idlers 32, located at a point a short distance beyond each end of the track-bar 20 and attached to a lug on the top of said carriage. Mounted in bearings on a frame 33 is a rotatable shaft 34, to one end of which is secured a sprocket-wheel 35, engaging the sprocket-chain 31, and loosely mounted to turn freely on said shaft inside the frame are two electromagnetic coils 36, spaced apart, with a disk 37, of soft iron, between splined on the shaft to turn therewith, said disk, together with the coils, forming an electromagnetic clutch 38. Each coil 36 is provided with a gear 39, secured thereto, and on a counter-shaft 40, mounted in bearings on said frame, is secured two pinions 41, one of which is in engagement with one of the gears 39 and the other with a double-width pinion 42 on a shaft 43, which double pinion is in mesh with the other gear 39, so that motion is transmitted from said counter-shaft to turn one gear and its coil in one direction and through the pinion 42 to turn the other gear and its coil in the opposite direction, motion being transmitted to said shaft 40 from a suitable electric motor 44 by a train of gearing.

That it may not be necessary to provide a very long scale-beam or more than one of them in order that the range or capacity of the scale may be sufficient for the purpose for which it is designed, one or more counterweights or hanging poises 45 is provided, said beam being provided with knife-edge pins 46, extending through and laterally from the sides of said beam near the outer end of the long arm thereof to project through the loops 47 formed at the upper end of each hanger of the weights, said loops extending upward at each side of the beam. A longitudinally-movable supporting table or member 48 is supported in any suitable manner by the casing to freely move longitudinally, and through openings 49 in said supporting-table extend the hanger-rods of said weights, which rods are each provided with a transverse pin 50 to engage the upper side of said table and hold the weights suspended in such a position that their loops will be out of contact with the supporting-pins 46, thus permitting the beam to move freely, said loops being longer than the limited distance which the pins travel with the vibration of the beam. The openings 49 in the table are of sufficient width to allow the pins 50 to pass freely through, but said openings are formed with lateral extensions or slots 51 of just sufficient width to receive the hanger-rods, so that when said weights are raised to bring their pins above the table and said table moved longitudinally the pins will engage the upper surface of the table and support the weights.

On the lower end of the poise 18 is secured a forwardly-extending arm 52, which when the poise is automatically run out on its beam to within a short distance of its extreme movement will engage the end of the supporting-table 48 and move the same longitudinally. One of the lateral slots 51 is longer than the other, and the weights are so spaced apart relative to said slot and openings that one of the weights will be dropped upon a slight movement of the table, and upon further movement the other weight will be dropped.

To raise the weights 45 from their suspended position on the beam to a height where they may be engaged and supported by the table, a lifter 53 is provided, having a guide-stem 54 engaging bearings in a bracket on the casing and sliding therein. The operating-bar 11 is provided with a forked end 55 to embrace the stem 54 and engages a pin extending through said stem, so that when said bar is moved by the operator stepping on the platform the lifter will be raised by said forked end. A coiled spring 56 is sleeved on the stem and operates to lower the lifter and also to return the bar 11 to its normal position. The table 48 is moved longitudinally in one direction by the poise 18, and to move the same in the opposite direction a lever 57, pivoted at its lower end to the casing and engaging a slot in the end of the table at its upper end, is provided. The lifter 53 is formed with an incline 58 at one end, which is engaged by a roll 59 on said lever 57, and a coiled spring 60 holds the roll firmly against said incline, which thus operates when the lifter is lowered to move the lever away from the table against the action of said spring and to hold the same in that position until the lifter is raised. When the lifter is raised, the lever is moved toward the table by the action of said spring, and if the table has been previously moved toward the beam will engage said table and move it back to the position from which it was moved by the sliding poise. This lever cannot, however, operate to move the table until the weights have been raised to bring their pins 50 above the table, as part of the metal from the opening 49 is turned downward at each side of the inner end of the slots 51 to form downwardly-extending guides 61, which engage the pins 50 as soon as the table is moved by the arm 57 and prevent its further movement until the pins are raised up through the openings in the table. To prevent the weights from being swung laterally by the spring 60, acting through the lever, table, and guides upon the pins 50, stops 62 are provided, extending outward from the side of the casing to near the opposite side of the weights. The hanger-rods of the weights are guided at their upper ends when out of use or in their raised position by providing extensions on the loops at one side of the beam forming guide-rods 63 to engage the sockets 64, provided therefor.

65 is a coin-chute leading from a suitable slot in the casing and provided with a section 66, consisting of side portions 67, of non-conducting material, connected at one edge by a metal strip 68, provided with a binding-post 69, and between the opposite edges is a block to which is secured a binding-post 70 and one end of a flat metal contact-spring 71, said spring extending downward and normally inward from the edge of the chute, so that when a coin is dropped in it will pass down the chute and wedge between said spring and metal strip, thus making an electrical connection between the two and closing the circuits of which they form a part. Mounted adjacent to said section 66 in a bearing on the chute and in any suitable supporting-frame is a shaft 72, upon which is loosely mounted a sleeve 73, to one end of which is secured the ratchet-wheel 74 and to the opposite end the gear 75, provided with a pin 76, extending from its side to engage a pawl 77, carried by an arm on said contact-spring 71. When the gear 75 is turned in one direction, the pin 76 will engage the pawl 77 and flex the contact-spring, thus releasing the coin, a stop-pin 78 on the arm preventing the pawl from turning and allowing the pin to pass, while the pin will freely pass the pawl when the gear is turned in the opposite direction.

Secured to the shaft 72 adjacent to the ratchet 74 is an arm 79, carrying a spring-pressed pawl 80 to engage the ratchet and turn the said ratchet and gear in one direction, and sleeved on the shaft is a coiled spring 81, secured at one end to the gear and at its opposite end to the frame in such a manner that when the gear is turned by the pawl 80 said spring will be put under tension and tend to turn the gear in the opposite direction. To hold said gear 75 from being turned by the spring, a pinion 82, mounted on a counter-shaft 83, engages with said gear, and on said shaft is secured a fan 84, one of the blades of which is engaged by a dog 85, carried by the armature of a suitable electromagnet 86. To turn the shaft 72 to wind up the spring 81, a pinion 87 is frictionally attached to the end of said shaft by providing a nut on the end of said shaft and interposing a spring-washer 88 between the nut and pinion, and a rack-bar 89 is held in engagement with said pinion to turn the same by a grooved roll 90, the lower end of said bar being attached to the end of the long arm of the operating-lever 11 and operated thereby.

When weight is put upon the platform and the operating-lever operated thereby, the rack-bar, which is normally held raised by said operating-bar, will be pulled downward, bringing its teeth into contact with the pinion 87 and through the frictional resistance of the washer 88 turning the shaft and winding up the spring 81 through the medium of the arm 79, secured on the shaft, and the pawl 80, which engages the ratchet to turn the gear 75, to one end of which the spring is attached as the shaft turns; but should said spring have already been wound up by a previous movement of the rack without having been released the friction-washer will allow the pinion to turn without turning the shaft. When the fan 84 is released by the dog 85, the spring 81 will unwind, turning the gear 75, which is retarded by the action of the fan, and said gear being connected to the shaft by the pawl and ratchet will turn the shaft and its attached pinion, said shaft being free to rotate when the rack is in its raised or normal position, as its teeth are out of engagement with the pinion, having passed the same during the upward movement of the rack.

In order that the operation of the various parts may be automatically controlled by the coin, the contact-spring 71 and strip 68 of the coin-chute are in the circuits of the motor 44, the clutch 38, and the electromagnet 86, as shown in Fig. 2, so that none of these devices will operate unless a coin is placed in the chute to make the electrical connection between the contact strip and spring and close the circuits. It is also necessary in order that the mechanism may operate automatically to show the correct weight of the person standing upon the platform that the operation of the clutch and magnet be controlled by the balancing of the scale-beam, as it is necessary to adjust the sliding poise back and forth (and throw the counterweights into operative position, if required) until the beam balances, when the magnet 86 should operate to release the coin, and thus stop the operation of all of the parts.

Extending inward from the end of the casing are two supporting-arms 91, and the reduced and extended end of the scale-beam projects between said arms, which form stops to limit its movement. Secured to each arm is a contact-point 92, and spring-contacts 93 are secured at one end to insulating-blocks on said arms, with their free ends projecting between the points and beam and normally out of contact therewith. The contact-point on the arm above the beam is electrically connected by a wire with one brush or terminal of one of the coils of the electromagnetic clutch, the other terminal of said coil being connected to the binding-post 69 of the coin-chute, and the contact-spring supported by the same arm 91 is connected to the battery or other source of electrical energy, which battery is in turn connected to the binding-post 70 on the opposite side of the coin-chute. The contact point and spring carried by the arm 91 below the beam are connected in a similar circuit with the terminals of the other coil of the clutch, and therefore each coil of the clutch is in a separate circuit, which circuits are normally open at two points—between the contact-strip 68 and spring 71 of the coin-chute and between the contact-points 92 and springs 93.

Extending through openings provided with insulating-bushings in the arms 91 are suitable movable contact-pins 94, each provided with heads or nuts near each end to limit their movement in the bushings and normally held toward the beam, which extends between their inner ends, the pin above the beam, by gravity, and the pin below the beam by a very light coiled spring sleeved thereon. The movement of the pins is such that when the beam is exactly in balance, as shown in Fig. 2, both pins will be in contact with the beam, which thus forms the connection between the two and closes the circuit; but if the scale is not in balance the end of the beam will be up or down from its mid-position between the supporting-arms, and thus one of the pins will be forced outward by the beam, which has moved away from the other pin, and the circuit will be broken. One of these pins is connected with one terminal of the electromagnet 86, the other terminal of which is connected to the binding-post 69 of the coin-chute, and the other pin is connected to the battery, which in turn is connected to the other binding-post, 70, of the chute. The circuit of the electromagnet is therefore normally open at two points, and when a coin is dropped in, thus closing one of the breaks, and the beam brought to a balance by the other mechanism the circuit will be closed and the armature of the magnet will be drawn down, releasing the fan, which fan will operate to release the coin, and thus open all of the circuits. The motor is connected in a separate circuit to said binding-posts, with the battery in the circuit, and when the coin is released the motor-circuit is opened, thus stopping the motor also.

When the operator steps upon the scale-platform, the first movement of the draft-rod operates the bar 11, which in turn operates the rack-bar 89 to wind up the spring 81. The bar is then released by the hook 16, and the rack-bar is again lifted. The operator then drops a coin into the chute, which at once operates to close the motor-circuit and set the motor in motion. The weight on the platform throws the scale-beam out of balance, its outer end moves up and pressing the spring-contact 93 into contact with the adjacent point 92 closes the circuit of one of the coils of the clutch, thus sending a current through the coil, which causes the clutch-disk 37 to be drawn firmly against said coil, which is being constantly driven in one direction by the motor. As long as the current is maintained in the coil the clutch-disk will be driven by said coil and through the shaft 34 and its sprocket drive the sprocket-chain to move the sliding poise along the beam. The poise will be moved outward on the beam until the beam balances, when the circuit of the electromagnet will be closed by the contact of both pins 94 with the beam and the magnet will operate to release the coin. If the beam should vibrate between the arms, there will be an instant during each movement in which the circuit of said magnet will be closed and the fan be released; but the fan would not have time to make more than a half-revolution, and as the gear carrying the pin 76 is many times larger than the gear on the fan-shaft the coin will not be released by such vibration.

When the weight on the platform is too great to be counterbalanced by the sliding poise, said poise will continue to be run out on the beam until the arm 52 engages and moves the supporting-table 48, when the first weight will be released, and if this is not sufficient to bring the beam down the poise will continue to be moved out and release the other weight. This will bring the beam down, opening the circuit controlling the clutch-coil and stopping the further outward movement of the poise on the beam and at the same time closing the circuit of the other coil of the clutch, which is continuously being turned in the opposite direction, and thus the motion of the sprocket-wheel will be reversed and the poise move in on the beam until said beam balances.

The poise and weights will be left in the position to which they are adjusted to balance until the machine is again operated, when the stepping upon the platform by the next person will operate the lever 11 and return the counterweights to position on their supporting-table.

Having thus fully described my invention, what I claim is—

1. In a scale, the combination with a beam and a sliding poise on said beam, of a counterweight, a support for said counterweight, and means for moving said poise and thereby releasing the weight to operate in conjunction with the poise.

2. In a scale, the combination with a beam and a sliding poise on said beam, of a counterweight normally held in an inoperative position, and means operating in relation to the movement of said poise for releasing the weight to allow the same to operate.

3. In a scale, the combination with the scale-beam, of a sliding poise on said beam, a counterweight normally held in an inoperative position, and means controlled by the deflection of said beam for moving the poise and operating, in relation to the position of the poise, to release the weight.

4. In a scale, the combination with the scale-beam, of a sliding poise on said beam, a counterweight, and means for supporting said weight in an inoperative position adjacent to the end of the beam and adapted to be moved by the poise to release the weight.

5. In a scale, the combination with the scale-beam, of a series of counterweights, means for normally holding said weights in an inoperative position and for releasing the same, one at a time, and means controlled by the position of the beam for operating the holding means, whereby one or more of the weights will be released to operate, according to the number required to deflect the beam.

6. In a scale, the combination with the scale-beam, of a series of counterweights, means for supporting said weights in an inoperative position adjacent to the end of said beam and for releasing the same, one at a time, a sliding poise on said beam, and means controlled by the deflection of the beam for moving the poise and operating in relation to the position of the poise to move the supporting means to release one or more of the weights.

7. In a scale, the combination with the scale-beam, of a counterweight, a bearing-pin on the beam, an extended loop on the weight to receive said pin, a table to support the weight with its loop out of engagement with the pin to allow the beam to freely move and adapted to be moved to release the weight, means for moving the table, and means for raising the weight to reëngage the table therewith.

8. In a scale, the combination with the scale-beam, of counterweights, bearing-pins on the beam, hangers on the weights provided with extended loops to receive the pins, a longitudinally-movable table provided with openings having lateral extensions through which the hangers pass, transverse pins on the hangers to engage the upper side of the table, means for moving the table longitudinally, and means for raising the weights to reëngage the transverse pins with the table.

9. In a scale, the combination with the scale-beam, of counterweights, a supporting-table for said weights formed with openings having lateral slots, guide-arms extending downward from the edge of the openings at the side of the slots, hangers on the weights provided with extended loops, bearing-pins on the beam extending through said loops, transverse pins on the hangers, a vertically-movable lifter to engage the lower ends of the weights, means for raising said lifter, a lever adapted to engage and move the table when the lifter is raised, and a spring to operate said lever.

10. In a beam-scale, the combination with the beam thereof, of a sliding poise consisting of a block embracing the beam, rolls on the block engaging the upper edge of the beam, a brake-lever pivoted to the block to engage one of the rolls, a spring to hold the brake in contact with the roll, and levers adapted to be engaged to hold the brake out of contact with the roll, and means for moving said poise provided with push-bars to engage the levers for holding the brake out of contact with the roll.

11. In a beam-scale, the combination with the beam thereof, of a sliding poise on said beam, a stationary track-bar adjacent to the beam, a carriage on said track, push-bars on said carriage pivoted to freely move vertically and extending horizontally toward the poise at each side thereof to engage and move the same, means for supporting said bars in a substantially horizontal position and means for moving the carriage.

12. In a beam-scale, the combination with the beam thereof, of a sliding poise on said beam consisting of a block embracing said beam and provided with a chamber, rolls pivotally secured within said chamber to engage the edge of the beam, a brake-lever in said chamber, a spring to hold the brake against one of the rolls, levers at each edge of the poise connected to the brake to operate the same, a stationary track adjacent to the beam, a carriage movable on said track, downwardly-curved arms on each end of said carriage, push-bars having pointed ends and provided with transverse bearing-pins to engage the arms, springs to support said push-bars in a substantially horizontal position with the upper end of the poise between, and means for moving the carriage.

13. In a scale, the combination with a beam and a sliding poise on said beam, of a motor-circuit, an electric motor in said circuit for moving said poise and means controlled by the balancing of the beam for breaking the motor-circuit.

14. In a scale, the combination with a beam and a sliding poise on said beam, of an electric motor for moving said poise, a motor-circuit, means for breaking the motor-circuit, and means controlled by the balancing of the beam for releasing the motor-circuit-breaking means.

15. In a scale, the combination with a beam and a sliding poise on said beam, of an electric motor for moving said poise, a motor-circuit, means for breaking the motor-circuit, a circuit closed by the balancing of the beam, and means in the last-named circuit for releasing the motor-circuit-breaking means.

16. In a scale, the combination with a beam and a sliding poise on said beam, of an electric motor for moving said poise, a motor-circuit, means for breaking the motor-circuit, a circuit closed by the balancing of the beam, and an electromagnet in said circuit for releasing said means.

17. In a scale, the combination with a beam and a sliding poise on said beam, of an electric motor for actuating the poise, a motor-circuit, means for breaking the motor-circuit, an electromagnet for releasing said means, an electromagnet-circuit, supports above and below the end of the beam and having openings and contact-pins to which the terminals of the magnet-circuit are attached, said pins being adapted to slide in said openings and having a limited movement therein, whereby the contact-pins will both contact the beam and close the circuit only when the beam is in its balanced position.

18. In a scale, the combination with automatic weighing mechanism and an electric circuit governing the operation of said mechanism, of contacts in said circuit, means for moving one of said contacts to break the circuit, an electromagnet to release said means, an electric circuit for the magnet, and means whereby the balancing of the beam operates to close the circuit of the magnet.

19. In a scale, the combination with automatic weighing mechanism and an electric circuit governing the operation of said mechanism, of contacts in said circuit, a pawl carried by one of said contacts, a gear, a pin on said gear to engage the pawl and move the contact when the gear is turned in one direction, a coiled spring to actuate said gear in one direction, means for turning the gear to put a tension on the spring, a dog to hold the gear from being turned by the spring, an electromagnet to operate the dog to release the gear, and an electric circuit for said magnet closed by the balancing of the weighing mechanism.

20. In a scale, the combination with automatic weighing mechanism and an electric circuit governing the operation of said mechanism, of contacts in said circuit, a pawl on one contact, a gear, a pin on said gear to engage the pawl, a coiled spring to actuate said gear in one direction, a pawl and ratchet to actuate the gear in the opposite direction to wind the spring, means for operating said pawl and ratchet, a shaft, a fan on said shaft, a pinion on the shaft in engagement with the said gear, a dog to hold the fan and gear from turning in one direction, an electromagnet to operate said dog to release said gear and fan, a circuit for the magnet, and means operated by the weighing mechanism to close the circuit when the mechanism comes to a balance.

21. In a scale, the combination with the beam and sliding poise on said beam, of an electric motor for actuating said poise, a motor-circuit, contacts in said circuit, a pawl on one of the contacts, a gear, a pin on said gear to engage said pawl, a spring to actuate said gear in one direction, a rack and pinion to actuate the gear in the opposite direction to wind the spring, a fan to retard the movement of said gear, a dog to hold said gear from being turned by the spring, an electromagnet for releasing the dog, a normally open circuit for the magnet closed by the beam when it comes to a balance, a draft-rod to actuate the beam, means for providing a limited movement of the draft-rod independently of the beam, and means actuated by said movement of the rod for moving the rack.

22. In a scale, the combination with the beam, of a sliding poise on said beam, counterweights normally supported out of operative contact with the beam, an electromagnetic clutch for controlling the movement of said poise and releasing said weights, an electric motor for rotating the clutch, means for controlling the clutch by the movement of the beam, a motor-circuit, contacts in said circuit, spring-actuated mechanism for moving one of the contacts to break the motor-circuit, a rack-bar and pinion to wind said spring, a draft-rod to operate the scale-beam, an operating-bar connected to the draft-rod and operated thereby and to which the rack-bar is connected, means for providing a limited movement of the draft-rod independently of the beam, and a lifter beneath the weights operated by said operating-bar.

23. In a scale, the combination with a scale-beam, of a sliding poise on said beam, a motor, an electromagnetic clutch rotated by said motor, a sprocket-chain to move the poise along the beam, a sprocket-wheel actuated through the clutch to engage the chain, contacts supported adjacent to one end of the beam above the same, an electric circuit connecting said contacts and one coil of the clutch, contacts supported adjacent to the end of the beam below the same, and an electric circuit connecting the contacts below the beam with the other coil of the clutch.

24. In a scale, the combination with a scale-beam, of a sliding poise on said beam, a sprocket-chain connected to said poise to move the same, a shaft, a sprocket-wheel on said shaft to drive the sprocket-chain, two electromagnetic coils on said shaft spaced apart and free to turn thereon, a clutch-disk splined on the shaft between said coils, a motor, means for transmitting motion from said motor to turn one of said coils in one direction and to turn the other coil in the opposite direction, contacts supported above and below the scale-beam, and an electric circuit connecting the terminals of one of the coils with the contacts above the beam and a circuit connecting the terminals of the other coil with the contacts below the beam.

25. In a scale, the combination with a scale-beam, of a sliding poise on said beam, a track adjacent to said beam, a carriage on said track adapted to engage and move the poise, idlers near each end of the track, a sprocket-chain secured to the carriage and engaging the idlers, a shaft, a sprocket-wheel on said shaft engaging the chain to drive the same, electromagnetic coils loosely mounted on said shaft and spaced apart thereon, a clutch-disk splined on the shaft between said coils, gears on the coils, a counter-shaft, pinions on said counter-shaft one of which engages and drives the gear on one of the coils, an intermediate pinion to transmit motion from the other pinion to the gear on the other coil, a motor, a train of gearing to transmit motion from the motor to the counter-shaft, contacts supported above and below the beam adjacent to its end, an electric circuit connecting the contacts above the beam with the terminals of one of the coils of the clutch, and a circuit connecting the contacts below the beam with the terminals of the other coil.

26. In a scale, the combination with the beam, of a sliding poise on said beam, counterweights normally supported adjacent to the end of said beam and out of contact therewith, means for moving the poise along the beam and for moving the support to release the weights, means for controlling the poise-operating means, a draft-bar pivotally supported at one end, a link connecting the opposite end of said draft-bar with the short arm of the scale-beam, a bearing-pin on the draft-bar intermediate its ends, a draft-rod, loops on the upper end of the draft-rod through which the bearing-pin extends, springs attached to the draft-bar and draft-rod to hold the latter raised relative to the former, an operating-bar pivoted intermediate its ends below the draft-bar, a rack-bar attached at its lower end to one end of the operating-bar, means operated by said rack-bar for operating the controlling means, a vertically-movable lifter to engage and raise the said weights and engaged and operated by the opposite end of the operating-bar, a lever pivoted intermediate its ends to the draft-rod, a similar lever pivoted intermediate its ends to the operating-bar with one end normally extending beneath the adjacent end of the other lever, stops to limit the movement of said levers, springs for holding the levers in engagement with the stops, a hook to engage and hold the lever on the operating-bar against its stop, and a lug to engage and operate the hook to release said lever.

27. In a scale, the combination with a beam, a sliding poise on said beam, a track-bar supported adjacent to said beam, a carriage slidable on said track, pusher-bars pivotally secured to the carriage and supported with the poise between their adjacent ends, an electromagnetic clutch, a sprocket-wheel driven by said clutch, a sprocket-chain driven by said wheel and secured to the carriage, an electric motor, a train of gearing to transmit motion from the motor to the clutch, a motor-circuit, contacts in said circuit, a pawl carried by said spring-contact, a stop-pin for said pawl, a shaft supported in bearings adjacent to the spring-contact, a sleeve on said shaft, a gear secured to one end of said sleeve and a ratchet-wheel secured to the opposite end thereof, a pin on the gear to engage the pawl, an arm secured on the shaft and carrying a spring-pawl to engage the ratchet, a pinion frictionally secured to said shaft, a rack to engage said pinion, a counter-shaft, a pinion on said counter-shaft in engagement with said gear, a fan on said counter-shaft, an electromagnet, a dog carried by the armature of the magnet to engage the fan, a draft-bar provided with a bearing-pin, a draft-rod having loops to engage said pin, an operating-bar connected at one end to the said rack-bar and forked at its opposite end, means carried by the draft-rod for engaging and operating the operating-bar, transverse bearing-pins on the beam near one end, counterweights provided with hangers having loops to receive said pins, guide-arms on said loops, guide-sockets to receive said guide-arms, a supporting-table provided with openings having lateral extensions through which the hangers of the weights extend, transverse pins on the hangers to engage the top of the table, a lifter provided with a sleeve engaged and operated by the forked end of the operating-bar, a spring sleeved on said stem, a lever to engage and move the table operated by the lifter in one direction, a spring to operate the same in the opposite direction, a stationary arm above and a stationary arm below the vibratory end of the beam, a contact-point on each of said arms, a contact-spring to engage each of said points, a circuit connecting the contact point and spring above the beam with one coil of the clutch and with the binding-posts of the said contacts, a circuit connecting the contact point and spring below the beam with the other coil of the clutch and with the binding-posts of the contacts, a sliding contact-pin extending through each of the arms above and below the beam and having a limited movement, and an electric circuit connecting the contact-pins with the electromagnet and with the binding contacts.

In testimony whereof I affix my signature in presence of two witnesses.

GUY HAMILTON.

Witnesses:
  OTTO F. BARTHEL,
  LEWIS E. FLANDERS.